G. S. SIMPSON.
Cheek Row Attachment to Corn Planters.

No. 232,151.    Patented Sept. 14, 1880.

Witnesses:
W. B. Masson
W. E. Bowen

Inventor
George S. Simpson
by E. E. Masson
atty.

UNITED STATES PATENT OFFICE.

GEORGE S. SIMPSON, OF DECATUR, ILLINOIS, ASSIGNOR TO JOSEPH S. TAIT AND FELIX B. TAIT, OF SAME PLACE.

CHECK-ROW ATTACHMENT TO CORN-PLANTERS.

SPECIFICATION forming part of Letters Patent No. 232,151, dated September 14, 1880.

Application filed January 21, 1880.

*To all whom it may concern:*

Be it known that I, GEORGE S. SIMPSON, of Decatur, in the county of Macon and State of Illinois, have invented certain new and useful Improvements in Check-Row Attachments to Seed-Planters; and I hereby declare that the following is a full, clear, and exact description of the same, reference being had to the accompanying drawings, making a part of this specification, in which—

Figure 1:
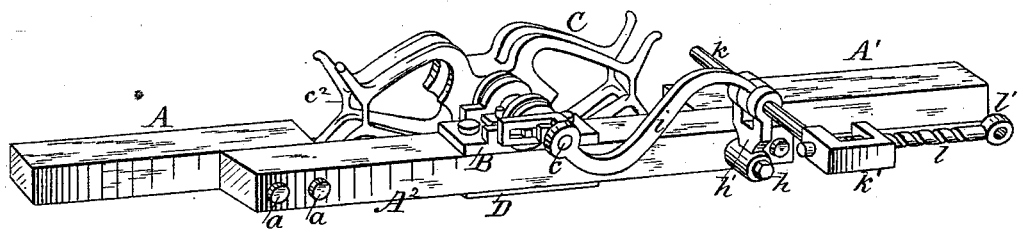
Figure 2:
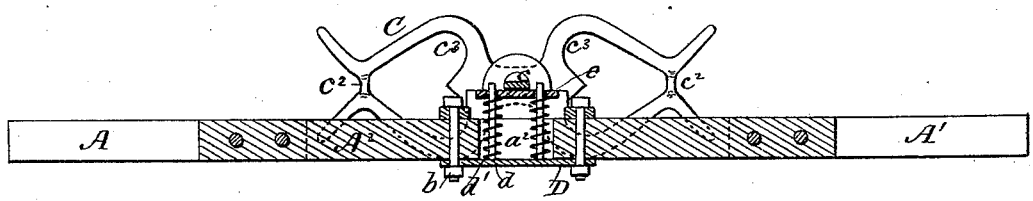
Figure 3:
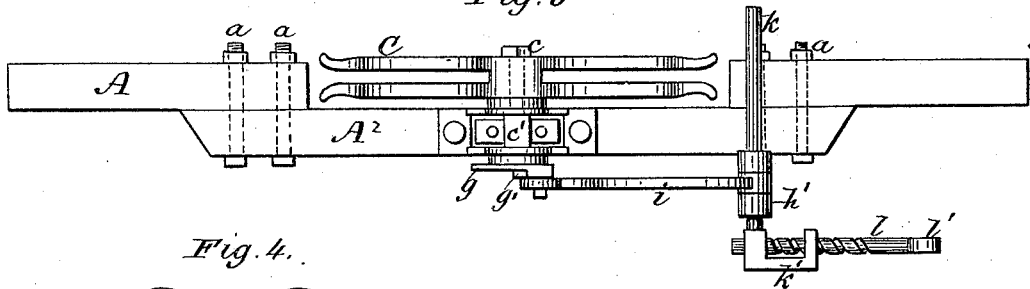
Figure 4:
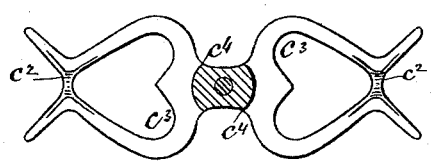
Figure 5:
Figure 6:
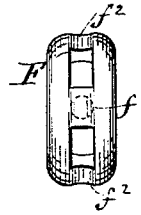

Figure 1 represents a perspective view of the improved check-row attachment to seed-planters. Fig. 2 represents a longitudinal vertical section of the same. Fig. 3 represents the check-row attachment in top view. Fig. 4 represents a longitudinal vertical central section of the double crank used to guide and to be operated by the knots of a check-row cord. Fig. 5 represents an enlarged view of the artificial knot or metal double ring placed upon a check-row cord in position to be closed and secured thereto. Fig. 6 represents the artificial knot in side view while open, and in section as closed.

My invention relates to that class of check-rowers which are automatic in their operation and are acted upon by a rope having knots at equal distances apart. It relates to improvements upon the device for which I obtained Letters Patent No. 217,751, dated July 22, 1879.

My improvement consists in the construction of the double-crank arms as now united in pairs at the outer ends; in having said double-crank shaft supported upon a frame formed of three pieces bolted together and the middle piece provided with a slot for the reception of the springs of the shaft-retaining platform; in having the double crank connected with an adjustable sliding arm, and thus adapted to be used on various seeding-machines, and in providing the check-row cord with metallic knots formed of two rings united by a broad bar furnished with a conical pin and two narrower bars, as will be hereinafter described in connection with the drawings, and then clearly pointed out in the claims.

In the drawings, A and A' represent the outer bars of the check-row attachment, upon the ends of which are generally mounted the pulleys used for guiding the check-row cord. These bars are united together by means of a central bar, $A^2$, placed alongside thereof and secured with bolts $a$, passing horizontally through them. Upon the middle of said bar $A^2$ is placed the bearing-box B, for the shaft $c$, carrying the double crank C. This box is provided with an opening in the center, corresponding with a slot, $a^2$, extending through the bar $A^2$. This slot is closed under by a plate, D, carrying vertically two pins, $d$, and said plate is retained by the same bolts, $b$, securing the bearing-box to the bar $A^2$. Upon the pins $d$ are placed coiled springs $d'$, to support the yielding platform $e$ and press it against the shaft $c$, where, in the portion $c'$ of its length, this shaft is made flat or rectangular. The springs $d'$, as now located in the slot of the bar $A^2$, are protected thereby against shocks, and thus rendered more lasting than if left exposed.

To strengthen the arms of the double crank C and insure the proper entrance of the knots on the check-row cord between said arms without materially increasing their weight, they are united by pieces $c^2$ near their extremities, to form a directing-funnel for the cord-knots F. These knots are cast of metal, and before being secured on the cord G are in the form of two horseshoes placed nearly side by side, and united at the toes or center by a bar, $f$, and at the ends by bars $f^2$. The central bar, $f$, carries a conical pin, $f'$, made to easily enter the strands of a cord, and said bar is about twice the size of each of the end bars, so that when the knot is finally secured on the cord in the form of a double ring, by pressing the ends of the casting together, the weight of the metal will be well balanced and the tendency of the cord twisting and untwisting while in use be prevented. Each ring of a pair forming a knot is beveled toward the center to give room for the strands of the cord expanded by the conical pin $f'$.

To operate the slides of a seed or corn planter with this device the knotted cord is placed between the arms of the double crank in such a position that one of the knots will enter the funnel-like opening between the pieces $c^2$. If the cord advances between the arms of the crank C, one of the knots will become lodged in one of the pockets $c^3$, and thereby revolve the crank either a half of a revolution at one impulse, or, if a little less than a half, until the cord bears against either of the corners $c^4$ of its central hub and forces it to accomplish a half of a revolution, the spring-platform $e$ intermittently locking its shaft after each half-revolution. The shaft $c$ carries upon its rear end a crank, $g$, to transmit a reciprocating motion to the slides of the seed-boxes. This crank, being grooved, is adjustably secured on the end of the shaft by a screw-bolt and a nut, $g'$, so that its length or throw can be changed to suit the required motion of the seed-box slides.

To render this check-row attachment suitable for various sized or organized planters, I pivot thereto, at $h$, a forked lever, $h'$, having the upper end of its branches perforated. The crank $g$ is connected to this forked lever by a rod, $i$, having an eye to fit between the forked branches of the forked lever $h'$, and through the perforated branches of the forked lever $h'$ and the eye of the connecting-rod $i$ is passed a rod, $k$, uniting said rod $i$ and forked lever, and projecting much beyond them. The rear end of this rod $k$ is formed with screw-threaded bearings $k'$, to receive a screw-threaded rod, $l$, to the end $l'$ of which the seed-slides are connected. By means of this adjusting screw-rod $l$ and the rod $k$, capable of adjustment by sliding through its bearings in the branches of the lever $h'$, the device can be attached to most of the seed-planters heretofore made without requiring any change of construction. The outer end of the connecting-rod $i$ may be branched where it connects with the lever $h'$ without materially modifying its action.

Having now fully described my invention, I claim—

1. In a check-row planter, the combination of a shaft provided with a hub having angular projections $c^4$, a series of arms arranged in double pairs on each side of said hub and adapted to operate as a crank, and connecting-pieces $c^2$, uniting said arms and forming funnels, substantially as and for the purpose described.

2. The combination of the bars A and A', central bar, $A^2$, double bolted thereto at each end, slotted centrally at $a^2$, and carrying shaft-bearings, with the shaft $c$ and double crank C, to carry a knotted check-row cord, substantially as described.

3. The combination of the supporting bar or bars, slotted centrally at $a^2$, shaft-bearings B, also slotted centrally, slot-closing plate D, carrying vertical rods $d'$ and coiled springs, yielding platform $e$, and shaft, with a double crank, C, substantially as described.

4. The combination of a check-row double crank, its shaft, adjustable crank $g$, connecting-rod $i$, frame or bar $A^2$, lever $h'$, pivoted thereto, and sliding rod $k$, passing through one end of said connecting rod and lever, substantially as and for the purpose described.

5. The combination of a check-row double crank, its shaft, adjustable crank $g$, connecting-rod $i$, frame or bar $A^2$, lever $h$, pivoted thereto, rod $k$, having screw-threaded bearings $k'$, and screw connecting-rod $l$, substantially as and for the purpose described.

6. The artificial knot made of malleable metal in the form of two rings united by a broad bar, $f$, carrying a conical pin, $f'$, and two narrow bars, $f^2$, adapted to meet and form a bar balancing the bar $f$, substantially as shown, and for the purpose described.

GEO. S. SIMPSON.

Witnesses:
A. E. McCLELLAN,
G. V. LORING.